Sept. 18, 1923.
R. O. STEARNS ET AL
1,468,420
PASTEURIZING DEVICE
Filed Feb. 1, 1922
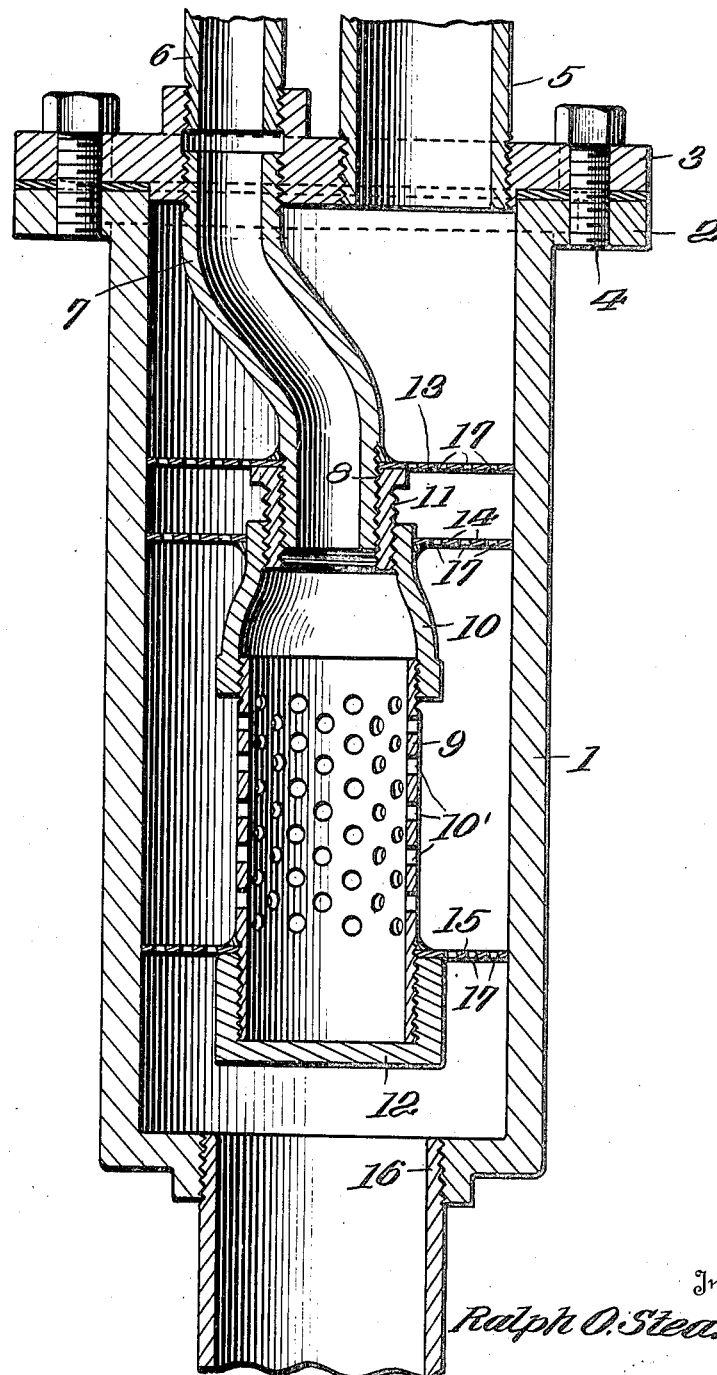
Inventors
Ralph O. Stearns and
Daniel E. McGraw.
By Sturtevant & Mason, Attorneys Patented Sept. 18, 1923.

1,468,420

UNITED STATES PATENT OFFICE.

RALPH O. STEARNS, OF WINTHROP, AND DANIEL E. McGRAW, OF NORTH LAWRENCE, NEW YORK.

PASTEURIZING DEVICE.

Application filed February 1, 1922. Serial No. 533,256.

*To all whom it may concern:*

Be it known that we, RALPH O. STEARNS and DANIEL E. McGRAW, citizens of the United States, residing, respectively, at Winthrop and North Lawrence, in the county of St. Lawrence, State of New York, have invented certain new and useful Improvements in Pasteurizing Devices, of which the following is a description, reference being had to the accompanying drawing and to the figures of reference marked thereon.

This invention relates to pasteurizing devices for milk, whey, skimmed milk or any liquid by-product of milk, and more particularly to such device wherein steam is used as the pasteurizing means.

At the present time it is illegal to pasteurize fluid milk to be shipped to the consumer by the pasteurization process in which the steam is brought into direct contact with the milk. However, several State laws relating to the pasteurization of whey and skimmed milk which are returned from the cheese factories to the farmers merely require that the skimmed milk or the like be heated to a temperature of not less than one hundred and fifty degrees (150°) F.

The present invention has for its object a pasteurizing device, for instance, such as could be used by a cheese maker to pasteurize his milk before its manufacture into cheese, there being no particular objection as so used with the steam coming into contact with the milk, because the increased yield would more than pay the adequate expense of pasteurizing, and since it would be perfectly legal since the condensed steam going into the milk and changing into water and would run off with the whey, just as the water does at the present time.

One of the main objects of the present invention is to provide a simple, inexpensive pasteurizer for the above purpose.

Another object of this invention is to provide a pasteurizer of the type described in which the whey or skimmed milk is brought into direct and intimate contact with steam so that each particle of whey or the like is thoroughly absorbed.

Still another object of this invention is to provide a simple type of pasteurizer provided with a steam chamber and with means for introducing whey or the like into the steam chamber, and with means for finally dividing the whey so that the steam will come into direct contact with minute particles of the whey, this latter means being constructed and arranged to prevent the escape of steam from the steam chamber.

Still another object of this invention is to provide an improved process for so pasteurizing the whey, skimmed milk and the like.

These and other objects will in part be obvious and will in part be hereinafter more fully disclosed.

Referring now particularly to the accompanying drawings:—

The figure represents a sectional elevation of one embodiment of my pasteurizing apparatus.

In general, the apparatus embraces any type of casing providing therein a steam chamber with a steam inlet thereto. Preferably the steam is admitted into the steam chamber in the form of very fine jets. In addition to the steam inlet, the chamber is also provided with a whey or skimmed milk inlet, and a discharge outlet for the pasteurized product. In the steam chamber between the whey inlet and discharge is disposed means for breaking up the whey into minute or finely divided particles so that in passing through the steam or steam jets, each particle of whey is brought into intimate contact with the steam to thoroughly pasteurize the same. Preferably this means is in the form of a series of perforated baffle plates arranged between the whey inlet and discharge so that the whey passes through first one and then another, and then through the steam chamber and finally through the baffle plate or plates before being discharged from the pasteurizer. In such a relation, the whey or skimmed milk in passing through the baffle plates enclosing the steam chamber forms a liquid seal to prevent the escape of steam in either direction. The condensed steam passes out with the whey or skimmed milk in the form of water.

Referring now more particularly to the accompanying drawings, the invention comprises preferably a cylindrical casing 1 of brass or any other material flanged at the top as at 2 to receive a top 3, preferably bolted on to flange 2 as at 4. This top is provided with a whey or skimmed milk inlet 5 in the form of a pipe and a steam inlet 6 in the form of a smaller pipe. Connected to the steam inlet 6 within the casing is another pipe 7 which preferably curves from one side as shown in the drawing to the central axis of the cylinder where it is exteriorly threaded as at 8. This pipe 7 at its inner end is connected with a larger pipe 9 by means of a threaded collar 10 and a theaded joint 11. The pipe 9 which, in fact, constitutes a sort of steam drum, is closed at its lower end by means of a threaded cap 12. The steam drum 9 is provided with a plurality of small holes or perforations 10' to permit the steam to jet out into the surrounding casing 1.

Means is provided in the casing 1 for breaking up the whey as it passes through the chamber. Preferably this means is constructed as a series of baffle plates 13, 14 and 15 arranged between the inlet 5 and a discharge outlet 16 at the bottom of casing 1. These plates may be secured in any desired manner and extend entirely across the casing to prevent the whey from passing therethrough except through perforations 17 therein. These perforations 17 in each of the plates perform at least two important functions. For instance, the perforations in the plate 13 divide the whey or skimmed milk into minute particles. The baffle plate 14 further divides the whey so that each particle or drop will surely be heated to the correct temperature while passing the jets discharging from the perforations 10 in the steam drum 9. The baffle plate 15 further retards the flow of whey through the steam chamber 1 so that the whey will surely be reheated to the required temperature of one hundred and fifty degrees (150°) F. In addition to these functions, the plates 13 and 15 have a further function of forming a liquid seal to prevent the escape of steam. For instance, the whey as it passes through the perforation 17 in the plates 13 and 14 will most effectively prevent the steam escaping upwardly and through the discharge 5. If steam were allowed to pass through the baffle plate 13, the flow of whey through inlet 5 would in some instances be stopped at 5. Likewise, the whey escaping through the perforations 17 of the baffle plate 15 forms a liquid seal to prevent steam in the steam chamber escaping through these perforations. The perforations 17 of baffle plate 14 also act to impede the progress of the whey as it passes through cylinder 1 and to more intimately break it up into minute particles.

From the above construction, it will be readily seen that the whey and skimmed milk in passing through the casing 1 from the inlet 5 to the discharge 16 is intimately broken up into small particles or drops which pass through the steam chamber or zone where the steam jets discharging from the perforations 10 thoroughly heat these particles to the required pasteurizing temperature. At the same time, the liquid seal prevents the escape of steam and permits the condensed steam to pass out of the discharge 16 in the form of water with the whey.

It is obvious that the invention contemplates various different means and designs of apparatus for carrying out this process, and furthermore, that the present type of apparatus is not restricted to the specific arrangement of steam jets and baffle plates. For instance, it is within the contemplation of this invention to inject the whey or skimmed milk in the finely divided form into the steam jets. It is also within the scope of this invention to dispose the baffle plates or other dividing means in other relations to the steam jets. The apparatus disclosed for carrying out this process is simple, economical and easy to assemble and apply to the apparatus in the existing cheese factories and creameries.

It is obvious that minor changes in the details of construction and the arrangement of the parts may be made without departing from the spirit of the invention as set forth in the appended claims.

Having thus described the invention, what we claim as new and desire to secure by Letters-Patent, is—

1. The process of pasteurizing liquid whey, skimmed milk and the like, comprising breaking up the liquid into finely divided particles and subjecting the same to the direct action of steam while in such finely divided condition at a temperature sufficient to pasteurize the liquid while preserving its liquid condition.

2. The process of pasteurizing whey, skimmed milk or the like comprising breaking up the substance into finely divided particles and subjecting the same to the direct action of steam while in such finely divided condition at a temperature of approximately one hundred and fifty degrees Fahrenheit.

3. A device for pasteurizing whey, skimmed milk and the like comprising a steam chamber, means for introducing steam thereinto, means for introducing the whey and the like into said chamber, and means therein for finely dividing said whey in the presence of the steam, and means for discharging said liquid whey together with the condensed steam.

4. A device for pasteurizing whey, skimmed milk and the like comprising a steam chamber, means for introducing whey and the like into said chamber, and baffles in said chamber for finely dividing said whey in the presence of the steam and means for discharging the liquid whey therefrom.

5. A device for pasteurizing whey, skimmed milk and the like comprising a steam chamber, means for introducing steam into said chamber, means for introducing whey and the like into said chamber, and means in said chamber for finely dividing said whey in the presence of the steam, said means preventing the escape of the steam from said chamber.

6. A device for pasteurizing whey, skimmed milk and the like, comprising a steam chamber having a steam inlet and a whey inlet and a discharge outlet, a plurality of plates disposed in said chamber and interposed in the path of travel of said whey from said inlet to said discharge outlet, said plates being constructed and arranged to subject minute portions of said whey to the direct action of the steam.

7. A device for pasteurizing whey, skimmed milk and the like, comprising a cylinder having a whey inlet and discharge at its opposite ends, a steam inlet at the whey inlet end of the cylinder, a perforated steam drum within the cylinder, a pipe connecting the steam inlet with said steam drum, a plurality of baffle plates separating the space in the cylinder surrounding the steam drum from the inlet end of the cylinder, and a suitable number of baffle plates separating the steam drum from the discharge end of the cylinder, said baffle plates having a suitable number of small perforations in and for the purpose set forth.

In testimony whereof we affix our signatures.

RALPH O. STEARNS.
DANIEL E. McGRAW